July 11, 1967     W. R. DERBY     3,330,818
ELIMINATION OF FOULING IN ZIEGLER POLYMERIZATIONS
Filed Feb. 18, 1963
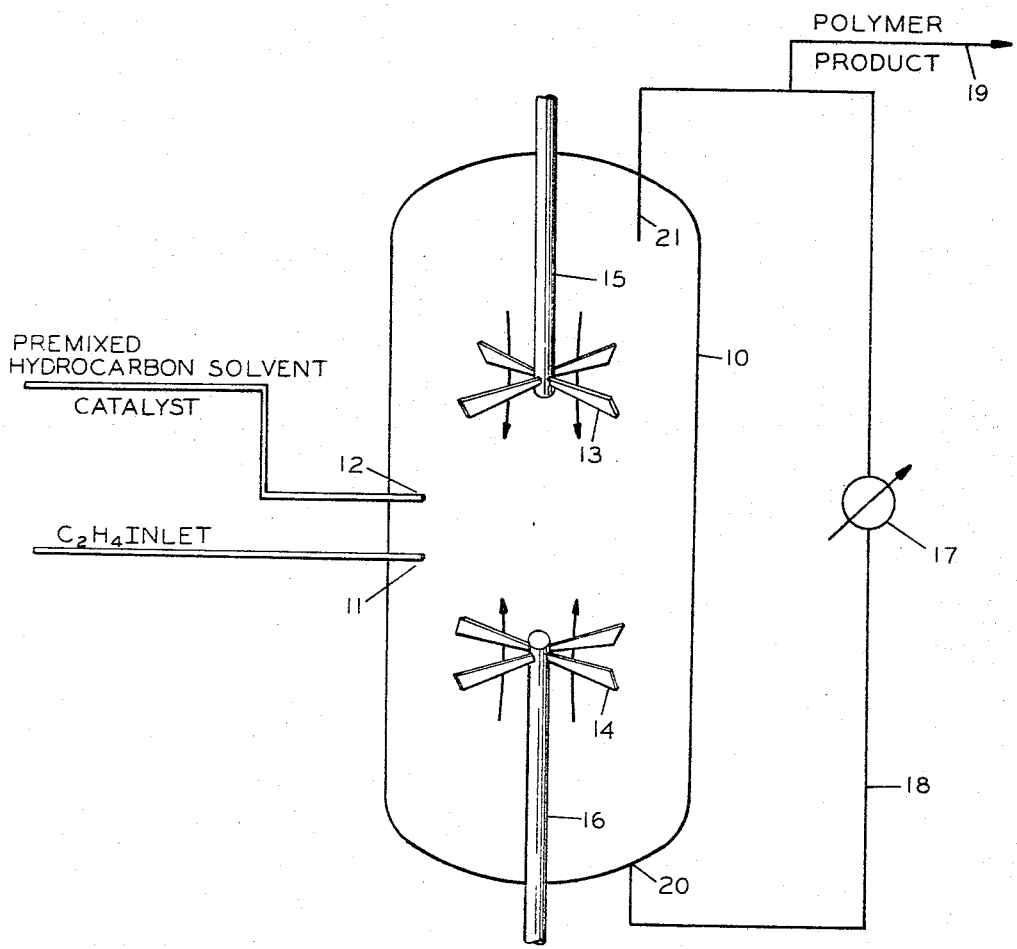
INVENTOR.
WALLENE R. DERBY
BY Lloyd B. Stevens, Jr.
ATTORNEY 3,330,818
ELIMINATION OF FOULING IN ZIEGLER
POLYMERIZATIONS
Wallene R. Derby, St. Louis County, Mo., assignor to
Monsanto Company, St. Louis, Mo., a corporation of
Delaware
Filed Feb. 18, 1963, Ser. No. 259,234
6 Claims. (Cl. 260—94.9)

This invention relates to an improved method for the low-pressure polymerization of olefins. More specifically this invention relates to an improvement useful in minimizing "plating" and fouling of reactor internals which occurs during the polymerization of olefins by low-pressure polymerization processes.

Polymerization of alpha-olefins to produce a polymer characterized by a high content of crystallinity is now well-known in the art. This type of polymer is produced by methods known as "low-pressure" polymerizations. Such methods are characterized by conducting the polymerization at temperatures ranging from about 20° C. to about 150° C. at pressures less than 500 pounds per square inch. These methods are further characterized by the presence of low-pressure or "Ziegler" catalysts. In general, these catalysts can be obtained by treating a compound of a metal of Group IV–B, V–B, VI–B, VII, or VIII, with a metal of Group I, II, or III in metallic, hydride, or organometallic form. Monomers suitable for low-pressure polymerization include mono-olefins such as ethylene, propylene, butylenes, and amylenes; di-olefins such as butadiene and isoprene; substituted olefins such as vinylcyclohexene, styrene, vinylnaphthalene, and vinyl aromatic hydrocarbons in general; alkyl vinyl ethers such as ethyl vinyl ether and 2-ethyl hexyl vinyl ether; and mixtures of two or more of the above-named compounds. A reference which provides a method for the production of several Ziegler polymers and which further provides references to Ziegler polymerizations and copolymerizations can be found in U.S. 3,009,908. It is my intent to apply my invention to any of the polymerizations mentioned therein as well as to any polymerization using Ziegler catalysts and any single monomer or mixtures of monomers. However, a particularly preferred group of monomers to which this invention is applicable are the alpha-olefins, especially those containing not more than four carbon atoms.

In general, one problem associated with low-pressure polymerization, whether utilizing one or more of the above-named monomer feeds or some other monomer, is the problem of fouling or "plating" of the reactor internals with polymer during the polymerization. This plating occurs because of the strong tendency of the low-pressure polymer to adhere to any surface it touches during the polymerization. This adhesion takes place on reactor walls, agitator blades, agitator shaft, baffles, heating and cooling coils, monomer inlet tubes, in fact any internal surface of the reactor, thereby clogging the reactor and forcing a shut-down and cleanup operation. Of course plating of this nature cannot be tolerated in a commercial operation, primarily because of the reduced efficiency of a plated reactor, the increased expense involved in trying to maintain a reasonably clean reactor, and the poorer quality product obtained from a polymerization conducted under such conditions.

It is therefore an object of this invention to provide an improved method for the low-pressure polymerization of olefins.

It is a further object of this invention to provide a method for reducing the amount of plating and fouling which occurs during the low-pressure polymerization of olefins. Additional objects, benefits, and advantages will become apparent as the detailed description of the invention proceeds.

This invention is based upon my discovery that plating of low-pressure polymerization reactors can be minimized by utilizing a mixing system to create a high degree of turbulence with no vortexing of the reactant mixture within the reactor. To achieve the kind of turbulence desired to minimize plating, it is advisable that a mixing system be so designed and operated as to prevent any vortexing of the reactant mixture. This may be accomplished in various ways. One method which has proved quite successful in minimizing plating has been the use of a mixing system comprising two opposed impellers, each of which forces the liquid toward the other. By utilizing such a system of agitation, it is possible to substantially reduce plating.

Incorporation of additional features into the reactor design can be further instrumental in reducing plating. For instance location of the monomer feed inlet and other inlets is important since proper location of these inlets can greatly reduce the tendency of the polymer to plate out at these points. Proper location of inlets can also permit the removal of baffles otherwise necessary to insure adequate mixing. Removal of baffles is desirable because this provides less surface available for plating. Requirements then for proper inlet location are: first the location must be such that adequate mixing of the charge stocks takes place without the use of baffles; and secondly the location must be such that a minimum of plating occurs at the inlet points. An injection point which I have found very suitable is a point along the wall of the reactor in the area between the two opposed impeller blades. The exact placement of these inlets need not be defined, but it is necessary that the charge stocks be introduced into the turbulent zone so that unmixed monomer or catalyst-solvent does not contact the impeller blades.

Another feature of this improved method is the absence of an internal heating/cooling coil. Removal of this coil permits increased turbulence within the reactor and provides less surface available for plating. An external polymer heat exchanger can be operated to provide adequate temperature control for the polymerization. Such a feature is not an indispensable part of my invention, but rather is included merely as a mode of operation well suited to the process disclosed herein.

Referring now to the drawing, there is shown a sectional view of a low-pressure polymerization reactor adapted for continuous operation. A polymerizable monomer such as ethylene is introduced into the reactor 10 at monomer feed inlet 11. A suitable fluid diluent or solvent premixed with a polymerization catalyst is introduced into the reactor 10 at catalyst/solvent inlet 12. Inlets 11 and 12 are so situated that their charges are deposited in a turbulent zone created by the two impellers 13 and 14 mounted on shafts 15 and 16. Impellers 13 and 14 are operated in opposed directions, so as to force the reaction mixture toward the center of the vessel. Temperature control of the polymerization is achieved by regulation of heat exchanger 17. Reactant mixture is removed from the reactor 10 at drawoff point 20, circulated through heat exchanger 17 and conduit 18 by means of a pumping system located along the conduit loop 18, and thence back into the reactor 10 through discharge point 21. Polymer dissolved or suspended in solvent is removed from the reactor 10 via conduit 19.

The figure and description thereof given above comprise a preferred embodiment of my invention insofar as the impellers are mounted on separate shafts. Such a provision permits the impellers to be rotated in opposite directions, thereby creating a shearing effect which is quite effective in causing the desired highly turbulent zone with no vortexing. The impellers may be mounted as shown in the figure or mounted on the sides of the reactor opposed to each other. An alternative embodiment wherein the pitch-bladed turbines are mounted on one shaft as described in Examples III and IV is also included within the scope of this invention.

Various necessary items of equipment, such as flow controllers, pumps, valves, bearings, packing glands, motors, temperature controllers, etc. have been omitted from the drawing in order to simplify it. Those skilled in the art will be aware of these omissions and be cognizant of the proper equipment to use.

It should also be understood that the process of this invention is equally applicable to batch-type and continuous polymerizations and that the drawing and examples deal only with a continuous polymerization merely for purposes of illustration.

The invention will be more clearly understood from the detailed description of the following specific examples thereof read in conjunction with the drawing previously described.

*Example I*

In this example, a polyethylene reactor having the following characteristics was used: the catalyst/solvent inlet was positioned on the top of the reactor vessel; an agitation system comprising one turbine with pitched blades was located midway in the reactor and operated so as to force liquid downward; the ethylene was introduced from the top of the reactor through a tube which discharged the feed near the agitator shaft and above the turbine at such a depth that the ethylene would be discharged just below the liquid surface; a heating/cooling coil surrounded the turbine blade and extended into the liquid; and baffles were used to aid mixing of the reactor charge stocks. The catalyst for this polymerization was a phenol-modified triisobutylaluminum/$TiCl_4$ mixture. A continuous polymerization utilizing a reactor vessel with the above-mentioned features was started. Ethylene absorption rate was 8 lbs./hour except during start-up and toward the end of the run. Ethylene absorption decreased toward the end of the run because of excessive fouling and plating. The reactor was operated under pressure (up to 8 p.s.i.g.) during most of the run, which lasted 18¼ hours. Other data pertinent to this polymerization are given in Table I of Example IV.

Plating during this run was very heavy. The coil, baffles, and turbine assembly were heavily coated with polyethylene. The heat transfer surfaces (coil, jacket, and exchanger) were plated to such an extent that the reactor temperature could not be controlled. This loss of temperature control forced the termination of the run.

*Example II*

The reactor used in Example I was modified in the following manner: the single pitch-bladed turbine was replaced with two unpitched flat-bladed turbines operated at very high tip speed of 1500 feet per minute. These turbines were mounted on the same shaft and spaced 10–12 inches apart, and the heating/cooling coil was removed.

A polymerization using this modified reactor was started. Ethylene feed rate was maintained at 8 lbs./hr. throughout the run; the reactor pressure was 0.36 p.s.i.g. The run was stopped after 18.4 hours. Other data pertinent to this run are given in Table I of Example IV.

The reactor was disassembled and inspected. Baffles, catalyst/solvent inlet, and turbine assembly were heavily plated. The upper turbine which was close to the monomer feed inlet was very heavily plated. The run was terminated by a plug which developed in the polymer heat exchanger line.

*Example III*

The reactor used in Example II was modified in the following manner: the agitation system was modified by removal of all baffles and by replacement of the two flat-bladed turbines with two pitch-bladed turbines spaced 10–12 inches apart. These turbines were mounted on one shaft and the pitch was adjusted so that the upper turbine would pump the liquid downward and the lower turbine would pump the liquid upward. The purpose of this was to eliminate any vortexing of the reactant mixture and provide instead a highly turbulent zone as a method of mixing. The tip speed of these turbines was 600 feet per minute.

A polymerization using the reactor so modified was started. Ethylene feed rate was 8 lbs./hr.; reactor pressure was initially .36 p.s.i.g. which was increased to 3 p.s.i.g. 18 hours after the start of the run and held at this pressure for the remainder of the run. The run was stopped after 77.2 hours, at which time the polymerization reactor was operating normally. Other data pertinent to this run are given in Table I of Example IV.

The reactor was disassembled and inspected. Plating of reactor walls, heat transfer surfaces, and agitation system was generally light. The only serious deposit was a lump of hard polymer about 3″ x 5″ x 5″ which formed on the end of the ethylene inlet. This did not cause the termination of the run however, which was stopped solely to permit inspection of the reactor interior.

*Example IV*

The reactor used in Example III was modified in the following manner: the ethylene inlet tube was moved to a position outside the turbines and midway between them.

A polymerization using this modified reactor was started. Ethylene feed rate was 11.5 lbs./hr.; a reactor pressure was adjusted as described in Example III. The run was stopped after 100 hours, at which time the polymerization reactor was operating normally. Other data pertinent to this run are given in Table I below.

TABLE I

| | Run No. (corresponds to Example No.) | | | | |
|---|---|---|---|---|---|
| | 1 | 2 | 3 | 4 (a) | 4 (b) |
| Time (hours) | 18.25 | 18.4 | 77.17 | 100 | 10. |
| Solvent | | | Phillips "isooctanes" | | |
| Solvent feed rate (lbs./hr.) | 46.0 | 43.4 | 44.55 | 46.16 | 45.53. |
| Ethylene feed rate (lbs./hr.) | 4.3–8.0 | 8.0 | 8.0 | 11.5 | 11.5. |
| $TiCl_4$ feed rate (lbs./hr.) | 0.232 | 0.225 | 0.219 | 0.221 | 0.221. |
| Al/Ti mole ratio | 0.523 | 0.500 | 0.495 | 0.499 | 0.503. |
| Ti/Solvent (mole Ti/l.) | 18.7 | 19.1 | 18.2 | 17.7 | 17.9. |
| Polymerization temp. (° C.) | 65 | 65 | 68–69 | 65 | 65. |
| Reactor pressure | 8 p.s.i.g. | .36 p.s.i.g. | .36 p.s.i.g. increased to 3 p.s.i.g. | .36 p.s.i.g., increased to 3 p.s.i.g. | |
| Baffles | Present | Present | Absent | Absent. | |
| Cooling coil | do | Absent | do | Do. | |
| No. of turbines | One | Two | Two | Two. | |
| Type of turbines | Pitched | Flat | Opposed pitch. | Opposed pitch. | |
| Position of $C_2H_4$ inlet in reactor | Upper portion. | Upper portion. | Upper portion. | Midway. | |
| Plating | Very heavy | Heavy | Light | Very light. | |

The reactor was not disassembled but was left standing while the triisobutylaluminum catalyst was changed to diisobutylaluminum hydride. This change was effected for reasons other than reduction of polymer plating. The run was continued for another 10 hours.

The reactor was disassembled and inspected. Plating was generally quite light except for a lump of polymer of 2–3 inches in diameter which formed around the ethylene inlet.

Table I presents various data applicable to the runs previously described.

A study of the above tabulation shows that the use of an opposed impeller agitation system results in a significant reduction in plating. As an illustration, the polymerization of Example III was carried on more than four times as long as, and yet produced appreciably less plating than, the polymerization of Example II. The necessity of the high turbulence zone is further convincingly demonstrated by comparison of runs No. 1 and 2 with runs No. 3 and 4. Plating is significantly reduced using the opposed impeller system of this invention. This reduction is even more significant when the lengths of the various runs are compared.

An additional improvement is noted in a comparison of run No. 3 with run No. 4. Relocation of the ethylene inlet appreciably minimized the plating of polymer around the inlet since the polymer lump was smaller after the 110 hour run of No. 4 than it was after the 77 hour run of run No. 3, and since plating in general was somewhat lighter in run No. 4 than in run No. 3.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, my invention is not meant to be limited by the catalyst concentrations and ratios given in the above table. It is generally applicable to low pressure polymerizations as described previously in this specification. Further, modification of various components in the reactor in a manner other than previously described is also within the scope of this invention. One example is the use of baffles. Their removal in runs No. 3 and 4 was a functional modification, i.e. the agitation system was adequate to achieve sufficient mixing without the use of baffles and their removal allowed a more uniform turbulence while at the same time providing less available surface for plating. However, polymerizations using my invention accompanied with baffles could be performed and would be within the scope of this invention. In addition, various types of impeller, propeller, and impeller/propeller arrangements are also possible within the scope of this invention.

Because of the broad scope of this invention specific embodiments have been described in terms of the polymerization of one suitable monomer feed, namely ethylene. This has been done for the sake of convenience and clarity of presentation. Those skilled in the art will be aware of minor changes in equipment and reactants which will enable this invention to be applied to any low-pressure polymerization.

Accordingly, these and other modifications are contemplated which can be made without departing from the spirit of the described invention.

What is claimed is:

1. A method for reducing plating of low-pressure polymerization reactor internals which comprises agitating the reactant mixture to form a zone of high turbulence by means of opposed impellers.

2. A method for reducing plating of low-pressure polymerization reactor internals which comprises first, agitating the reactant mixture to form a zone of high turbulence by means of opposed impellers, and secondly introducing the monomer feed into the polymerization reactor at a point within the turbulent zone and between the opposed impellers.

3. A method according to claim 2 wherein introduction of all charge stocks is accomplished in the same manner as the introduction of the monomer feed.

4. A method according to claim 1 wherein the monomer feed use in the polymerization is a 1-olefin having not more than 4 carbon atoms.

5. A method according to claim 2 wherein the said monomer feed is a 1-olefin having not more than 4 carbon atoms.

6. A method according to claim 3 wherein the said monomer feed is a 1-olefin having not more than 4 carbon atoms.

References Cited
UNITED STATES PATENTS

| | | | |
|---|---|---|---|
| 1,569,049 | 1/1926 | Stufflebeam | 259—132 |
| 2,893,984 | 7/1959 | Steelbach | 260—93.7 |
| 2,984,657 | 5/1961 | Grundmann | 260—94.9 |
| 3,056,769 | 10/1962 | Reay | 260—94.9 |
| 3,107,238 | 10/1963 | Hooker | 260—94.9 |
| 3,108,094 | 10/1963 | Morgan | 260—94.9 |

OTHER REFERENCES

Perry: Chemical Engineers Handbook, 3rd ed., McGraw-Hill, 1950, page 1208 relied on.

JOSEPH L. SCHOFER, *Primary Examiner.*

F. L. DENSON, *Assistant Examiner.*